United States Patent Office 3,235,528
Patented Feb. 15, 1966

3,235,528
TERNARY INTERPOLYMER AND THERMOSET-
TABLE COATINGS OF SAID INTERPOLYMERS
AND A POLYEPOXIDE
Sherman C. Lashua and Lieng-Huang Lee, Midland,
Mich., assignors to The Dow Chemical Company,
Midland, Mich., a corporation of Delaware
No Drawing. Filed Mar. 19, 1962, Ser. No. 180,845
18 Claims. (Cl. 260—31.2)

This invention appertains to new ternary interpolymers and to thermosetting coating compositions based thereon. More particularly, the invention appertains to ternary interpolmers of monovinyl aromatic hydrocarbons of the benzene series, monoolefinically unsaturated carboxylic acids and polyalkylene glycol esters of certain monoolefinically unsaturated carboxylic acids and coating compositions comprising polyepoxide compounds in combination with the new ternary interpolymers.

Thermosetting coating compositions have been prepared which comprise polyepoxide compounds and ternary interpolymers composed of certain monovinyl aromatic hydrocarbons of the benzene series, certain monoolefinically unsaturated carboxylic acids and lower alkyl esters of certain monoolefinically unsaturated carboxylic acids having from 1 to 4 carbon atoms in the alkyl radical substituent group. In order to obtain coating compositions with the proper balance of desirable properties from those polyepoxide/ternary interpolymer compositions, described above, it was necessary to employ in the preparation of those ternary interpolymers a predominant amount of the monovinyl aromatic component, a comparatively smaller amount of the carboxylic acid component, and a relatively large amount, up to about 45 percent by weight of the total ternary interpolymer, of the most expensive component, the lower alkyl ester. Although the cured films based on those polyepoxide/ternary interpolymer coating compositions demonstrated some measure of physical property adequacy, such as flexibility and impact resistance, it became evident that their resistance against degradative detergent action, organic solvent attack, and staining by highly colored materials, such as mustard, catsup, lipstick, iodine, Coca-Cola, Cado ink, and the like, left much to be desired. Increased amounts of the monovinyl aromatic component were included in those coating compositions in an attempt to counteract their dissatisfactory tendency to stain and to deteriorate when submitted to prolonged contact with aqueous detergent solutions and organic solvents. The increased monovinyl aromatic content, in turn, made the cured coating films more brittle and less suitable than before, due to a decrease in the previously held desirable properties of flexibility and impact resistance.

Recently, improved cured coatings possessing an excellent balance of the majority of necessary physical properties, as set forth above, were disclosed in copending application Serial No. 29,807, filed May 18, 1960, and now abandoned. Those coatings were obtained from polyepoxide cross-linked coating compositions which contain ternary interpolymers composed of a predominant amount of a monovinyl aromatic hydrocarbon of the benzene series, a comparatively smaller amount of certain monoolefinically unsaturated carboxylic acids, and a small amount (e.g., 2.5 to 30 percent by weight) of higher alkyl esters of certain monoolefinically unsaturated carboxylic acids having from 6 to 12 carbon atoms in the alkyl radical group. Although highly satisfactory performance was received from the higher alkyl ester-containing cured coatings, the cost and commercial availability of those higher alkyl esters of the most advantageously employed monoolefinically unsaturated carboxylic acids were prohibitive in the consideration of large-scale commercial production of those coating compositions. In addition, although stain resistance in those cured coatings was very satisfactory when contacted for prolonged periods with common staining materials, such as mustard, catsup, iodine, Coca-Cola, and lipstick, there was a tendency for those cured coatings to absorb and retain stains produced by prolonged contact with water-insoluble, highly penetrating, staining materials, such as Cado ink.

It is, therefore, an object of the present invention to provide coating compositions based on polyepoxide cross-linked ternary interpolymers wherein the interpolymers are composed of certain monovinyl aromatichydrocarbons of the benzene series, certain monoolefinically unsaturated carboxylic acids and polyalkylene glycol esters of certain monoolefinically unsaturated carboxylic acids.

Another object of the present invention is to provide improved coating compositions that are adapted to be employed as protective and decorative, cured, thermoset coatings on the exposed surfaces of various porous and non-porous substrata, including articles fabricated of wood and wood products (such as cellulosic fiber, ground and shredded wood, and the like), glass, and, particularly, structural metals and their corresponding alloys.

A further object of the present invention is to provide cured thermoset coatings that advantageously possess an excellent balance of the necessary physical properties, e.g., flexibility, impact resistance, as well as resistance to degradation due to prolonged contact with aqueous detergent solutions, organic solvents, and highly penetrating, staining materials, such as Cado ink.

An additional object of the present invention is to provide novel economically-produced ternary interpolymers of the type previously described that are suitable for use as the excellent property-conveying active ingredient in the preparation of the improved thermosetting polyepoxide cross-linked coating compositions also contemplated by the invention.

Hereinafter, other objects and advantages will become apparent to those skilled in the art from consideration of the description of the invention.

There have been prepared in accord with this invention valuable ternary interpolymers composed of certain monovinyl aromatic hydrocarbons of the benzene series, certain monoolefinically unsaturated carboxylic acids, and palyalkylene glycol esters of certain monoolefinically unsaturated carboxylic acids which have been found useful per se and are even more valuable as the active film-forming ingredient in improved thermosetting coating compositions when combined and polymercially cross-linked with certain polyepoxide compounds. These new ternary interpolymers permit the use of predominant amounts of monovinyl aromatic hydrocarbons in the interpolymers without forming brittle films when admixed with polyepoxide compounds to produce coating compositions. The thermoset coatings of the invention possess such desirable properties as excellent stain resistance, good flexibility, good stability toward the deleterious effects of mild aqueous detergent solutions on prolonged contact, and good impact resistance and are substantially superior to coatings obtained from similar known compositions made with ternary interpolymers containing lower alkyl esters or higher alkyl esters of certain monoolefinically unsaturated carboxylic acids.

A wide variety of monovinyl aromatic hydrocarbons of the benzene series may be used in accordance with the present invention, representative of which are monomers such as styrene, α-methylstyrene, p-chlorostyrene, 2,4-dichlorostyrene, 2,5-dichlorostyrene, p-bromostyrene, p-methylstyrene, α-methyl-p-methylstyrene, m-ethylstyrene, p-isopropylstyrene, tertiarybutylstyrene, vinyl naphthalene and the like. Mixtures of two or more such compounds may be employed if desired. However, styrene is a preferred monomer.

The monoolefinically unsaturated monocarboxylic acid monomers to be employed in accordance with the present invention are selected from the group consisting of acrylic acid and methacrylic acid.

A wide variety of alkylene glycol esters of certain monoolefinically unsaturated monocarboxylic acids may be used in accordance with the present invention, representative of these monoalkyl, monoaryl, and monoalkaryl esters which can be prepared by directly esterfying the monoolefinically unsaturated monocarboxylic acids with alkylene glycol alkyl, aryl, or alkaryl ethers in the presence of sulfuric acid as a catalyst. Acrylic and methacrylic acids have been used because they are the most readily commercially available. In like manner, the most readily available or readily prepared are the various alkylene glycol esters of these two acids. Accordingly, these monomeric esters include the monoacrylates and monomethacrylates of ethylene glycol methyl-, -ethyl-, -n-butyl-, -phenyl-, 2-ethylbutyl-, 2-ethylhexyl-, -p-tert.amylphenyl- -ditert.-amylphenyl-, and the like; propylene glycol methyl-, -ethyl-, -n-propyl-, isopropyl-, -n-butyl-, -tert,-butyl-, -2-ethylhexyl-, -phenyl-, cyclohexyl-, -benzyl-,-2-naphthyl-, and the like; and polyalkylene glycols having from 2 to 10 alkylene groups in the straight chain and having an alkyl, aryl, or alkaryl radical in continuous, branched, cyclic, or phenylene configuration. Examples of such polyalkylene glycol esters of acrylic or methacrylic acids are dipropylene glycol methyl acrylate, dipropylene glycol ethyl acrylate, dipropylene glycol n-butyl acrylate, diethylene glycol methyl acrylate, diethylene glycol ethyl acrylate, diethylene glycol n-butyl acrylate, tripropylene glycol methyl acrylate, tripropylene glycol ethyl acrylate, tripropylene glycol n-butyl acrylate, diethylene glycol methyl methacrylate, diethylene glycol ethyl methacrylate, diethylene glycol n-butyl methacrylate, tripropylene glycol methyl methacrylate, tripropylene glycol ethyl methacrylate, tripropylene glycol n-butyl methacrylate; di-, tetra-, penta- and decamethylene glycol monoalkyl esters of methacrylic acid, wherein the alkyl substituent group contains from 1 to 6 carbon atoms and corresponding interpolymerized mixtures thereof.

The new ternary interpolymers of the invention can be prepared by interpolymerizing a mixture of at least one monovinyl aromatic hydrocarbon of the benzene series, a monoolefinically unsaturated monocarboxylic acid, and at least one alkylene glycol ester of a monoolefinically unsaturated monocarboxylic acid in an inert organic solvent medium for the monomers and resulting interpolymer. The monomeric constituents are admixed and interpolymerized in proportions corresponding to from about 40 to about 93, and preferably from about 60 to about 89, weight percent of monovinyl aromatic hydrocarbon of the benzene series, from about 5 to about 20, and most particularly from about 7 to about 10 weight precent of monoolefinically unsaturated monocarboxylic acid, and from about 2 to about 40, and more specifically from about 4 to about 30 weight percent of alkylene glycol ester of a monoolefinically unsaturated monocarboxylic acid, depending on the balance of properties desired in the ultimate product application. All total weights of these interpolymer compositions are based on 100 weight percent of the combined weights of the interpolymerized monomeric components.

Essentially complete conversion of the reacted monomers to the desired ternary interpolymer can be accomplished in a period of about 3 hours at temperatures within the range of from about 80° to 175° C. under atmospheric or superatmospheric pressure. The inert organic solvent polymerization medium can be selected from a group of solvents consisting of toluene, xylene, mineral spirits, and the like.

The interpolymerization reactions are most effectively performed with the assistance of a peroxygen catalyst or a combination of peroxygen catalysts, such as those selected from the group consisting of benzoyl peroxide, tert.-butyl peroxide, cumene peroxide, tert.-butyl hydroperoxide, cumene hydroperoxide, to mention but a few of the vast number of suitable peroxygen catalytic reagents that could be used. The catalyst may be employed in an amount of from about 0.1 to about 2.0 weight percent as based on the weight of the monomers.

The ternary interpolymers of the invention are usually and most conveniently produced and further formulated as a solution of the interpolymer dispersed in the inert organic solvent polymerization medium. These ternary interpolymer solutions can be employed per se, or employed in the preparation of the polyepoxide cross-linked coating compositions also contemplated by the present invention.

The useful polyepoxide cross-linked coating compositions of the invention comprise mixtures of substantially stoichiometric amounts of one of the new ternary interpolymers with a corresponding stoichiometric amount of a suitable, low molecular weight polyepoxide compound, as a cross-linking agent. The polyepoxide compound, for ease of incorporation and formulation with the ternary interpolymer solution, is most generally dissolved in an organic solvent which is the same or miscible with the solvent employed in the ternary interpolymer solution. In addition to the organic solvents already suggested as satisfactory as the polymerization medium and diluent for the ternary interpolymers, other miscible organic solvents for the epoxide compounds which will fill the requirements are methyl ethyl ketone, methyl isobutyl ketone, methyl propyl ketone, diacetone alcohol, diethyl ketone, ethyl isopropyl ketone, mixtures thereof, and the like; as well as methyl acetate, ethyl acetate, butyl acetate, mixtures of these esters, and the like; and various liquid alkylene glycol ether solvents, such as ethylene glycol ethyl ether, ethylene glycol n-butyl ether, diethylene glycol methyl ether, diethylene glycol n-butyl ether, mixtures thereof, and the like. The particular diluent to be used will depend to a great extent upon the choice of components selected for the film-forming solids and, secondarily, upon individual preference and economical considerations.

The solids content of the solution will depend on the solubilizing efficiency of the organic solvent for the particular solute chosen and on the desired thickness of the coating. As a general rule of thumb, the solute should be present in an amount of from about 5 to about 60 percent by weight of the total composition.

Among the various types of epoxide compounds suitable for incorporation in the coating compositions of the invention are liquid and semi-solid condensation products resulting from the reaction of appropriate quantities of epichlorohydrin and 2,2'-bis(4-hydroxyphenyl)propane in the presence of an alkali. These characteristically different diglycidyl ethers of 4,4'-isopropylidene diphenols applicable in the instant coating compositions have a range of epoxide equivalent weights of from about 140 to about 375, solution viscosity values, as determined on 60 weight percent resinous solute in diethylene glycol n-butyl ether at a temperature of 25° C., of from about 300 to about 6400 centipoises or Gardner-Holdt viscosity values from $A_2$–B, and Gardner-Holdt color gradations within the range of from less than 1 to about 10.

Specifically applicable diglycidyl ethers of the type defined above include any of such liquid diglycidyl ethers having epoxide equivalent weights in the range of from about 230 to about 250, Gardner-Holdt color of about 5 and solution viscosities of 60 weight percent solute in diethylene glycol n-butyl ether at 25° C. in the range of from about 400 to about 800 centipoises. Also, any of the instant liquid diglycidyl ethers having an epoxide equivalent weight not exceeding 179, a Gardner-Holdt color of about 1.0 and absolute viscosity at 25° C. not exceeding 6400 centipoises can be employed. Exemplary of a third species of diglycidyl ethers of 4,4′-isopropylidene diphenol are those semi-solid epoxide compounds having an epoxide equivalent weight within the range of from about 300 to about 375, a Gardner-Holdt solution viscosity value of from A₁–B as determined on diethylene glycol n-butyl ether solution containing 60 weight percent solute solids at 25° C., and a Gardner-Holdt color gradation of about 8. Both liquid and semi-solid types of diglycidyl ethers of 4,4′-isopropylidene diphenol within the scope set forth above are effectively employed in the improved thermosetting coating compositions of the invention.

It will be appreciated by persons skilled in the polyepoxide compound art that other types of diglycidyl ether condensation products may be incorporated, such as the diglycidyl ether of 4,4′-methylene diphenol having an average molecular weight of about 495, an epoxide equivalent weight of about 174 and a specific gravity in the order of about 1.1950 as measured at about 100° F.

An additional class of epoxide compounds useful in this invention is typified by aliphatic complex polyepoxides having at least two terminal epoxide groups per molecule and substantially free from reactive substituents other than epoxide and hydroxyl groups. These epoxides include 1,2-epoxy-containing polyethers of polyhydric alcohols, such as the diglycidyl ether of ethylene glycol, propylene glycol, trimethylene glycol, butylene glycol, diethylene glycol, triethylene glycol, dipropylene glycol, and the like. Also included within the comprehension of the invention are the polyglycidyl ethers of polyhydric alcohols having a 1,2-epoxy equivalency greater than one, such as the polyglycidyl ethers of glycerol, diglycerol, erythritol, pentaglycerol, penta-erythritol, mannitol, sorbitol, polyallyl alcohol, polyvinyl alcohol, and the like. Mixtures and blends of these complex polyepoxides are also useful in the present inventive concept. Such materials as those above described are disclosed in U.S. patents numbered 2,500,449 and 2,512,996.

Exemplary of such aliphatic complex polyepoxides are a diglycidyl ether of dipropylene glycol having an epoxide equivalent weight of 197, an absolute viscosity of 52 centipoises at 25° C., and Gardner-Holdt color of less than 1; and a polyepichlorohydrin having an epoxide equivalent weight of 210, an absolute viscosity of 100 centipoises at 25° C. and Gardner-Holdt color of less than 1.

As is customary in the formulation of coating compositions containing polyepoxide compounds, when, from about 0.3 to about 3.0 weight percent as based on the resinous solids content of the coating composition of any of the succeeding types of catalyst curing agents are incorporated, generally satisfactory cured coating finishes are obtained. Representative of catalyst curing agents which may be employed in this capacity for instant purposes are dodecyl trimethyl ammonium chloride, obtained as "Arquad 12"; tetramethyl ammonium chloride; trimethylbenzyl ammonium acetate; tertiary amines; borontrifluoride piperidine; and the like. However, for instant purposes, 2,4,6-tri(dimethylaminoethyl)phenol, obtained as "DMP-30," was found to be a very effective catalytic curing agent.

Titanium dioxide (rutile) composed of about 99.4 percent TiO₂ may be used as the pigment constituent of the coating compositions of the present invention. However, it will be appreciated that other hiding and extender pigments of suitable particle size commonly used in organic, thermosettable, polymeric coating compositions, such as carbon blacks, iron oxide blacks, iron oxide yellow, red iron oxides, both the 72–76 percent grade and the 96–98 percent grade, cadmium red, toluidene red, alizarine red, chrome oxide, pigment green B, phthalocyanine blues and greens, ultramarine blue, Hansa yellow, cadmium yellow and metal oxides, hydroxides, silicates, sulfates, sulfides, and chromates and the like may also be used either alone or in admixture with one another or with titanium dioxide (rutile and anatase), clays, talc, calcium carbonate, barium sulfate, and various grades of lithapone, to produce coatings of various kinds. These coatings are, however, of particular value when produced with white pigments that are highly resistant to yellowing on baking.

Coated articles are prepared by spraying, dipping, brushing, or otherwise applying one or more coats of the polyepoxide/ternary interpolymer liquid coating composition of this invention onto the surface being coated. Following a brief period of air drying at room temperature, the coated articles are baked or cured at 275° F. to 350° F. The resulting protective coating, usually in the order of 1.0 to 1.5 mils thick, has properties, such as excellent flexibility, very good impact resistance, excellent organic solvent, aqueous detergent and stain resistance, that are superior to those of the finishes obtained from prior art coating compositions of the same general type.

In order more fully to illustrate the invention, the following examples are included. The examples are for the purposes of illustration only and it is intended that no undue limitation be read into the invention by reference to the examples and the discussion thereof. All parts in the following examples are intended to mean parts by weight unless otherwise indicated.

*Example I.—Preparation of styrene/acrylic acid/diethylene glycol n-butyl acrylate interpolymer*

Into a one-liter resin pot equipped with a reflux condenser, a sealed stirrer and a dropping funnel was charged about 300 grams of xylene and about 20 percent of a monomer-catalyst solution containing about 261 grams of styrene, about 24 grams of acrylic acid, about 15 grams of diethylene glycol n-butyl acrylate, 0.75 gram of benzoyl peroxide, and 0.75 gram of t-butyl hydroperoxide.

The initial charge was subsequently heated to reflux (140° C.) at which time the remaining monomer-catalyst solution was introduced by means of the dropping funnel at a constant rate of approximately 6 milliliters per minute. Following the last addition of the monomer-catalyst solution, the reaction mixture was subsequently maintained at reflux temperature for an additional three-hour period.

Thereafter, the polymer solution was allowed to cool to room temperature. The resulting polymerization product was a clear, viscous liquid solution that was confirmed by analysis to contain a ternary interpolymer composed of about 87 weight percent of interpolymerized styrene, about 8.0 weight percent of interpolymerized acrylic acid and about 5 weight percent of interpolymerized diethylene glycol n-butyl acrylate dissolved in the xylene reaction medium. The ternary interpolymer was formed in the xylene solution at a solids content level of about 50 weight percent.

*Example II.—Preparation of the thermosetting coating composition*

The following materials in the parts by weight as indicated were blended together to form an organic solvent solution having dispersed therein about 60 weight percent of total solids.

Ingredients: Parts by weight
87% styrene/8% acrylic acid/5% diethylene glycol n-butyl acrylate interpolymer solution (containing 50 parts by weight interpolymer and 50 parts by weight xylene) _____ 100
Diglycidyl ether of 4,4′-isopropylidene diphenol (having E.E.W. of 179 max. and viscosity of 6400 cps. max.) _____ 9.5
Titanium dioxide (rutile, having TiO₂ content of 99.4%) _____ 59.5
Xylene (additional amount) _____ 5.7
Methyl ethyl ketone _____ 23.8

The above pigmented thermosetting coating formulation was subsequently diluted so as to contain a solids content of about 50 weight percent by stirring in the following blend of organic solvents.

Solvent: Parts by weight
 Ethylene glycol ethyl ether _____ 11.9
 Butyl acetate _____ 11.9
 Xylene _____ 15.7

About 0.3 weight percent, based on the resinous solids content of the coating composition, of 2,4,6-tri(dimethylaminomethyl)phenol, a catalytic curing agent, was admixed with the coating composition at 50 weight percent solids concentration which was subsequently applied onto the polished surfaces of 25 mils phosphated steel panels, obtained as "Bonderite 1000" steel panels, by means of a draw-down blade so constructed as to deposit an even, continuous coating of approximately 1.5 mils in thickness when dry. Subsequently, the coated panels were air dried for about 10 minutes and then suspended in an air-circulating oven which was maintained at a temperature of about 350° F. for about 30 minutes.

The steel test panels having thereon the resultant thermoset coatings were examined for flexibility, impact resistance, and resistance to a variety of stain-providing materials and to hot aqueous detergent solutions.

Each of the coated panels was tested according to standard procedures. In the mandrel flex test each panel was bent rapidly around a mandrel of ¼ inch in diameter. Then, any sign of failure due to cracking of the finish was observed. The result is recorded as the successful flexure around the ¼ inch diameter mandrel. Impact resistance is compared by dropping a one pound ball nosed weight an arbitrary distance and recording the number of impacts required prior to the first noticeable failure of the dried coating finish.

Stain resistance was tested by placing each type of stain-producing material in direct contact with the dried coating finish for approximately 60 hours and then attempting to remove the stain-producing material by sponging off with a moderately warm dilute solution of a mild soap in water. If the stain had penetrated the finish and resisted removal by cleansing, the finish failed the stain resistance test.

Aqueous detergent resistance was tested by partly submerging individual finished test panels of each particular coating composition into a relatively hot (90° F.) aqueous solution of the synthetic detergent, obtained as "Tide," for about 100 hours. Thereafter, each of the test panels was examined for blisters, non-adherence, and other signs of coating degradation. These tests showed the instant dried and cured polyepoxide/interpolymer coating finishes to have an excellent balance of physical properties, such as flexibility exceeding those stresses provided by flexure over a ¼ inch diameter mandrel, impact strength on the front and reverse sides of test panels exceeding 40 inch-pounds, very good resistance against degradative aqueous detergent action and outstanding resistance against staining of such highly penetrating colored materials as mustard, catsup, lipstick, iodine, Coca-Cola, and, particularly, Cado ink. With regard to stain resistance, it was observed that the instant cured coating finishes were far superior to known polyepoxide/terpolymer coating finishes in which the terpolymer component contained an interpolymerized higher alkyl acrylate in place of the interpolymerized alkylene glycol monoalkyl ether acrylate which is present in the new polyepoxide/interpolymer coating compositions of the present invention.

*Example III.—Preparation and property evaluation of thermoset coatings containing alkylene glycol monoalkylether esters of acrylic acid*

Employing polymerization procedures of Example I, a series of six different ternary interpolymer compositions were prepared which were composed of about 87 weight percent of interpolymerized styrene, about 8 weight percent of interpolymerized acrylic acid and about 5 weight percent of the following species of interpolymerized mono- and polyalkylene glycol monoalkyl esters of acrylic acid:

(DE) Diethylene glycol ethyl acrylate
(DM) Diethylene glycol methyl acrylate
(TPM) Tripropylene glycol methyl acrylate
(DPM) Dipropylene glycol methyl acrylate
(EE) Ethylene glycol ethyl acrylate
(EB) Ethylene glycol n-butyl acrylate Hereinafter, the various ternary interpolymer compositions and the corresponding polyepoxide/ternary interpolymer coating compositions will be indicated by the initials, such as DE, DM, etc. which are shown immediately above preceding the alkylene glycol ester names.

Also, in accord with the teachings of Example I, the six interpolymer compositions, presently under discussion, were likewise formed in the xylene reaction medium solution at a solids content level of about 50 weight percent.

Subsequently, the six ternary interpolymer solutions, prepared above, were formulated as pigmented coating compositions by employing the same kinds and amounts of additive materials in the manner set forth in Example II. In addition, 0.3 weight percent, as based on the total weight of the resinous ingredients in the formulated coating composition, of a curing agent, 2,4,6-tri(dimethylaminomethyl)phenol, was blended into each of the six coating compositions.

The viscosity of each of the six formulated coating compositions are determined by the time in seconds required for a standard volume of each of these coating compositions to empty out of a conventional No. 4 Ford Cup viscosimeter. The viscosity values in seconds were: DE, 34.9; DM, 35.4; TPM, 24.2; DPM, 26.0; EE, 21.9; and EB, 25.7.

These coating compositions each at about 50 weight percent solids concentration were applied over the polished, phosphated surfaces of bonderized steel panels, obtained as "Bonderite 1000" panels, by means of a draw-down blade which, after drying, provides the deposition of even, continuous coating films of about 1.5 mils in thickness. In due course, the coated panels were air dried for about 10 minutes and then suspended in an air-circulating oven which was maintained at a temperature of about 350° F. for about 30 minutes.

Following the oven cure, each of the bonderized steel panels having thereon a thermoset film of about 1.5 mils in thickness of one of the six novel polyepoxide/ternary interpolymer coating compositions, described above, was tested for flexibility, impact resistance, resistance toward degradation by aqueous detergent solutions.

It was observed that there were no apparent differences in the excellent flexibility and the excellent impact resistance of the six different thermoset coatings as a function of the variation in length of the alkylene glycol alkyl side chain substituent groups held by the six different acrylic acid ester components. All of the six coating compositions were able to withstand flexing over a standard ¼ inch mandrel without showing any signs of cracking and, in addition, all six types of coated test panels were able to withstand 30 inch pounds of impact on both the front and the reverse sides of each panel without cracking, chipping, shattering, or otherwise showing any signs of brittleness. The severe, 100 hour, standard hot detergent test indicated that finishing coats of all of the instant thermoset coating compositions were very resistant to the possible hydrolytic degradation often suffered by other thermoset polymeric finishes when in contact for prolonged periods with aqueous detergent solutions.

*Example IV.—Preparation and property evaluation of thermoset coatings containing $C_1$ through $C_{12}$ alkyl acrylates*

For purposes of comparing the properties of the thermoset pigmented polyepoxide/ternary interpolymer coatings of the invention with known pigmented polyepoxide/ ternary interpolymer coatings, a series of seven different pigmented thermosettable coating compositions was prepared and evaluated by means of the same polymerization, formulation, and coating application procedures as are set forth in Example III for the preparation, application, and evaluation of six of the novel polyepoxide/ternary interpolymer coatings of the invention. The essential difference in each of the seven comparative thermosettable coating compositions was the inclusion in each of a different ternary interpolymer component in the amount of about 5 weight percent, as based on the total weight of the corresponding interpolymer. These variable interpolymer components included the following alkyl esters, either higher alkyl or low alkyl, of acrylic acid: methyl-, ethyl-, n-butyl-, hexyl-, octyl-, decyloctyl-, and lauryl acrylates.

A comparison of the test data of the seven ternary interpolymer coatings, each coating containing one of the seven different alkyl acrylates of varied carbon atom chain length, showed that, in general, the alkylene glycol monoether esters of acrylic acid impart greater flexibility to the coating compositions of the invention in which they are contained than do the alkyl acrylates of similar carbon atom side chain length. The differences in the impact resistance of the two systems in point are seen when the values of reverse side impact are compared. All six of the alkylene glycol monoether acrylate-containing coating finishes were able to withstand at least 30 inch-pounds of impact, while the maximum impact resistance for the seven samples of alkyl acrylate-containing coating finishes was 20 inch-pounds.

*Example V.—Preparation and property evaluation of thermoset polyepoxide/ternary interpolymer coatings containing alkylene glycol monoalkylether esters of methacrylic acid*

A one-liter resin pot equipped with a reflux condenser, a sealed stirrer, and a dropping funnel was charged with about 300 grams of xylene and about 20 percent of a monomer-catalyst solution containing about 261 grams of styrene, about 24 grams of acrylic acid, about 15 grams of ethylene glycol methyl methacrylate, 0.75 gram of benzoyl peroxide, and 0.75 gram of t-butyl hydroperoxide.

The initial charge was subsequently heated to reflux (140° C.) at which time the remaining monomer-catalyst solution was introduced by means of the dropping funnel at a constant rate of approximately 6 milliliters per minute. Following the last addition of the monomer-catalyst solution, the reaction mixture was subsequently maintained at reflux temperature for an additional three-hour period.

Thereafter, the polymer solution was allowed to cool to room temperature. The resulting polymerization product was a clear, viscous liquid ternary interpolymer dissolved in its xylene reaction medium. By analysis, it was confirmed that the dissolved ternary interpolymer was composed of about 87 weight percent of interpolymerized styrene, about 8 weight percent of interpolymerized acrylic acid, and about 5 weight percent of interpolymerized ethylene glycol methyl methacrylate. This ternary interpolymer (EM-5) was formed and dissolved in the xylene reaction medium at a solids content level of about 50 weight percent.

Following the polymerization procedures set forth immediately above, xylene solutions of two other interpolymers (DB-5 and PM-5) were prepared which were composed of about 87 weight percent of styrene, about 8 weight percent of acrylic acid, and, as the third interpolymerized component, the DB-5 interpolymer contained about 5 weight percent of interpolymerized diethylene glycol n-butyl methacrylate and the PM-5 interpolymer contained about 5 weight percent of interpolymerized propylene glycol methyl methacrylate.

In like manner, xylene solutions of three corresponding types of ternary interpolymers (EM-20, DB-20 and PM-20) were also prepared following the same polymerization procedures and suitable amounts of monomers, solvent, and catalysts so as to obtain three different ternary interpolymer compositions each composed of about 72 weight percent styrene, about 8 weight percent of acrylic acid, while the EM-20 interpolymer also contained about 20 weight percent of interpolymerized ethylene glycol methyl methacrylate, the DB-20 interpolymer also contained about 20 weight percent of interpolymerized diethylene glycol n-butyl methacrylate and the PM-20 interpolymer also contained about 20 weight percent of interpolymerized propylene glycol methyl methacrylate.

The xylene solutions of ternary interpolymers EM-5, DB-5, PM-5, EM-20, EB-20 and PM-20 all had an interpolymer solids content of about 50 weight percent. Also, the total interpolymer weight of each of the six ternary interpolymers was equal to 100 weight percent as based on the total monomer weight of the three components in each interpolymer composition.

Subsequently, these six 50 weight percent ternary interpolymer solutions in xylene were each, in turn, formulated into pigmented coating materials. Thereafter, each type of coating was applied and cured on polished, exposed surfaces of a series of 25 mil bonderized steel panels, obtained as "Bonderite 1000" steel panels. Ultimately, flexibility and impact resistance properties of all six of the resulting pigmented polyepoxide/ternary interpolymer coating finishes were evaluated. Coating formulation, application, and physical property evaluation procedures of Example II were used to prepare the six poly(alkylene glycol monoalkyl methacrylate)-containing polyepoxide ternary interpolymer coating compositions, discussed immediately above.

Results of flexibility and impact resistance tests on the six polyepoxide/ternary interpolymer coatings containing one of each of the ternary interpolymers, EM-5, DB-5, PM-5, EM-20, DB-20 and PM-20, are shown in Table I which follows. All of the coated bonderized steel panels, which were evaluated, had an average film thickness, when dried, on each major surface of each panel of 1.2 mils.

TABLE I.—EVALUATION OF POLY(ALKYLENE GLYCOL ETHER METHACRYLATE)-CONTAINING POLYEPOXIDE/TERNARY INTERPOLYMER COATINGS

| Designation of coating composition | Pigmented coatings | | |
|---|---|---|---|
| | Flexibility over ¼ in. mandrel observed results | Impact resistance in./lbs. | |
| | | Panel front | Panel back |
| EM-5 | Excellent—no cracks | 30 | 15 |
| EM-20 | ----do---- | 60 | 60 |
| DB-5 | Few fine cracks | 35 | 10 |
| DB-20 | Excellent—no cracks | 55 | 50 |
| TPM-5 | Few tiny cracks | 35 | <10 |
| TPM-20 | Excellent—no cracks | 60 | 60 |

*Example VI.—Preparation and property evaluation of clear and pigmented polyepoxide/ternary interpolymer coatings containing from 2 to 20 weight percent of interpolymerized diethylene glycol n-butyl acrylate*

Employing the procedures for preparation, formulation, coating application, and coating property evaluation of Example V, clear and pigmented polyepoxide/ternary interpolymer coating compositions containing from about 2 to about 20 weight percent of interpolymerized diethylene glycol n-butyl acrylate were prepared. All clear (lacking only the titanium dioxide pigment) and pigmented coating compositions in this series were formulated so as to contain about 50 weight percent of polymer solids in an organic solvent solution composed of a predominant amount of xylene.

A commercially available clear coating composition, obtained as "Duracron 200," was used as a control coating with which to gauge the impact resistance values of this series of thermoset clear coatings of the invention. "Duracron 200" is believed to be an organic solvent solution of a thermosettable polyepoxide/interpolymer clear coating composition wherein the interpolymer component is composed of interpolymerized styrene, an interpolymerized lower alkyl ester of acrylic acid and/or interpolymerized acrylic acid per se, and acrylamide which has been further reacted with formaldehyde. About a 1 mil average thickness thermoset coating of "Duracron 200" on "Bonderite 1000" steel panels gave an average impact resistance value as measured on the panel front surface of about 12 inch pounds.

A commercially available white pigmented thermosetting coating composition, obtained as "Dynakote," was used as a control coating with which to gauge the impact resistance values of this series of titanium dioxide pigmented coating compositions of the invention. "Dynakote" is believed to be an organic solvent solution of a thermosettable pigmented polymeric coating composition composed primarily of a blend of polyepoxide resin and a ternary interpolymer containing about 72 weight percent of interpolymerized styrene, about 8 weight percent of interpolymerized acrylic acid, and about 20 weight percent of an interpolymerized lower alkyl ester of acrylic acid, such as ethyl-, propyl-, or n-butyl acrylate. The percentage weight proportions of polyepoxide solids content to ternary interpolymer solids content are thought to be approximately 20 weight percent of the former to about 80 weight percent of the latter component. A pigmented thermoset coating of approximately 1.5 mils of "Dynakote" on "Bonderite 1000" steel panels showed an average impact resistance value as measured on the front surface of each panel of about 30 inch pounds and the flex tests of this "Dynakote" thermoset pigmented coating over a ¼ inch diameter mandrel produced many fine cracks in the coating where it was bent over the mandrel.

Table II, which follows, shows the data from the evaluation of the thermoset clear and thermoset titanium dioxide pigmented coatings of the invention wherein these coatings contain from about 2 to about 20 weight percent of interpolymerized diethylene glycol n-butyl acrylate.

It is apparent that the thermoset clear coatings of the invention containing from about 2 to about 16 weight percent of interpolymerized diethylene glycol n-butyl acrylate, within the limits of experimental error, have impact resistance values which are at least twice as good as the "Duracron 200" thermoset clear coating control samples that are believed to contain more than 30 weight percent of interpolymerized acrylic acid and/or interpolymerized lower alkyl ester of acrylic acid. In addition, the clear thermoset coatings of the invention, which contain combined weight percentages of interpolymerized acrylic acid and interpolymerized diethylene glycol n-butyl acrylate approaching the weight percentages of interpolymerized acrylic components believed to be present in "Duracron 200," show impact resistance values at least three times as good as their "Duracron 200" counterparts.

The thermoset titanium dioxide pigmented coatings of the invention containing about 2 weight percent of interpolymerized diethylene glycol n-butyl acrylate show impact resistance values equivalent to those shown by the thermoset titanium dioxide pigmented "Dynakote" control coating which is believed to contain about 20 weight percent of interpolymerized lower alkyl acrylate. Advantageously, the thermoset pigmented coatings of the invention containing about 20 weight percent of interpolymerized diethylene glycol n-butyl acrylate provide impact resistance values twice as good as those of its thermoset "Dynakote" control coating which contains the same weight percent of a different acrylic acid ester.

Of additional significance, the improved thermoset pigmented coatings of the invention show excellent flexibility over a ¼ inch diameter mandrel with no failure of coatings containing from as little as about 6 to about 20 weight percent of interpolymerized diethylene glycol n-butyl acrylate, while "Dynakote" pigmented control coatings having an interpolymerized lower alkyl acrylate content of about 20 weight percent, when flex tested under the same conditions, showed a profusion of fine cracks over the area of the coating which was flexed.

TABLE II.—EFFECT OF POLY(DIETHYLENE GLYCOL N-BUTYL ACRYLATE) CONCENTRATION ON THERMOSET POLYEPOXIDE/TERNARY INTERPOLYMER COATINGS

| Ternary interpolymer—Composition in weight percent | | | Clear coatings | | Pigmented coatings | |
|---|---|---|---|---|---|---|
| Styrene | Acrylic acid | Acrylic acid ester | Flex over ¼ inch mandrel | Impact resistance, inch/pounds, front | Flex over ¼ inch mandrel | Impact resistance, inch/pounds, front |
| 90 | 8 | 2 | No failure—stretched condition. | 28 | Fine cracks | 30 |
| 88 | 8 | 4 | do | 25 | do | 40 |
| 86 | 8 | 6 | do | 23 | No failure | 40 |
| 84 | 8 | 8 | No failure | 28 | do | 50 |
| 82 | 8 | 10 | do | 29 | do | 50 |
| 80 | 8 | 12 | do | 28 | do | 50 |
| 78 | 8 | 14 | do | 30 | do | 55 |
| 76 | 8 | 16 | do | 30 | do | 60 |
| 74 | 8 | 18 | do | 36 | do | 60 |
| 72 | 8 | 20 | do | 40 | do | 60 |

It is understood that many new film-forming ternary interpolymer compositions and polyepoxide coating compositions based thereon are obtainable by the practice of this invention. By variation of interpolymer components and by variation of the additive components, such as pigments, thickeners, heat and light stabilizers and others, that may be included in the polyepoxide cross-linked ternary interpolymer coating formulations, a wide variety of the instant useful ternary interpolymers and a multiplicity of polyepoxide cross-linked thermosettable coating compositions based thereon can be made. It is the purpose of this invention to provide novel and highly utile ternary interpolymers which lend themselves to these significantly improved coating end products, particularly of value in protective coating applications for common structural metal substrata, such as iron, steel, and aluminum, both primed and unprimed. Thus, the compositions are useful for coating automobile parts, home appliances, aluminum siding, cans, and the like, requiring remarkable flexibility, highly satisfactory impact resistance, as well as notable resistance toward the degradative effects of aqueous detergent solutions, and highly penetrating staining materials. It is not intended that the invention should be limited by modifications and variations which will be effected in particular instances by those requiring coatings for specific uses. Modifications and variations which occur to those skilled in the art are deemed to be within the scope of this invention.

What is claimed is:

1. A thermosettable coating composition consisting essentially of a mixture of a substantially stoichiometric amount of (I) a ternary interpolymer composed of (a) from about 40 to about 93 weight percent of monovinyl aromatic hydrocarbon of the benzene series, (b) from about 5 to about 20 weight percent of monoolefinically unsaturated monocarboxylic acid selected from the group consisting of acrylic acid and methacrylic acid, and (c) from about 2 to about 40 weight percent of a monoester of (1) an alkylene glycol monoalkyl ether wherein said alkyl contains from 1 to 4 carbon atoms and (2) a monoolefinically unsaturated monocarboxylic acid selected from a group consisting of acrylic acid and methacrylic acid, said ester having no free hydroxyl groups, the total compositional weight of said ternary interpolymer composition being equal to 100 weight percent of the combined weight percentages of the interpolymerized monomeric components; (II) with a corresponding stoichiometric amount of a liquid polyepoxide resin having an epoxide equivalent weight of at least 170, said mixture of (I) and (II) being dissolved in at least one inert organic solvent.

2. The thermosettable coating composition of claim 1, also containing from 0.3 to about 2 weight percent of the total sum of the weights of the resinous solid of an amine-type curing agent.

3. The thermosettable coating composition of claim 2 also containing pigment.

4. The thermosettable coating composition of claim 1, wherein said inert organic solvent is a solvent blend of about 60 weight percent of xylene, about 20 weight percent of methyl ethyl ketone, about 10 weight percent of butyl acetate, and about 10 weight percent of ethylene glycol ethyl ether.

5. The thermosettable coating composition of claim 1, wherein said liquid polyepoxide resin is the diglycidyl ether of 4,4'-isopropylidene diphenol having a maximum epoxide equivalent weight of from 176 to 179 and a maximum viscosity value under standard conditions of temperature and pressure of from about 400 to 6400 centipoises.

6. The thermosettable coating composition of claim 1, wherein said monovinyl aromatic hydrocarbon of the benzene series of component (a) is styrene.

7. The thermosettable coating composition of claim 1, wherein said alkylene glycol ester of a monoolefinically unsaturated monocarboxylic acid of component (c) is diethylene glycol n-butyl acrylate.

8. The thermosettable coating composition of claim 1, wherein said alkylene glycol ester of a monoolefinically unsaturated monocarboxylic acid of component (c) is diethylene glycol ethyl acrylate.

9. The thermosettable coating composition of claim 1, wherein said alkylene glycol ester of a monoolefinically unsaturated monocarboxylic acid of component (c) is diethylene glycol methyl acrylate.

10. The thermosettable coating composition of claim 1, wherein said alkylene glycol ester of a monoolefinically unsaturated monocarboxylic acid of component (c) is tripropylene glycol methyl acrylate.

11. The thermosettable coating composition of claim 1, wherein said alkylene glycol ester of a monoolefinically unsaturated monocarboxylic acid of component (c) is dipropylene glycol methyl acrylate.

12. The thermosettable coating composition of claim 1, wherein said alkylene glycol ester of a monoolefinically unsaturated monocarboxylic acid of component (c) is ethylene glycol ethyl acrylate.

13. The thermosettable coating composition of claim 1, wherein said alkylene glycol ester of a monoolefinically unsaturated monocarboxylic acid of component (c) is ethylene glycol n-butyl acrylate.

14. The thermosettable coating composition of claim 1, wherein said alkylene glycol ester of a monoolefinically unsaturated monocarboxylic acid of component (c) is ethylene glycol methyl methacrylate.

15. The thermosettable coating composition of claim 1, wherein said alkylene glycol ester of a monoolefinically unsaturated monocarboxylic acid of component (c) is diethylene glycol n-butyl methacrylate.

16. The thermosettable coating composition of claim 1, wherein said alkylene glycol ester of a monoolefinically unsaturated monocarboxylic acid of component (c) is propylene glycol methyl methacrylate.

17. A thermosettable coating composition consisting essentially of a mixture of a substantially stoichiometric amount of (I) a ternary interpolymer composed of from about 60 to about 89 weight percent of sytrene, from about 7 to about 10 weight percent of acrylic acid, and from about 4 to about 30 weight percent of diethylene glycol n-butyl acrylate, the total compositional weight of said ternary interpolymer composition being equal to 100 weight percent of the combined weight percentages of the interpolymerized monomeric components; (II) with a corresponding stoichiometric amount of diglycidyl ether of 4,4'-isopropylidene diphenol having a maximum epoxide equivalent weight of 179 and a maximum viscosity value under standard conditions of temperature and pressure of about 6400 centipoises, said mixture of (I) and (II) being dissolved in an inert organic solvent blend composed of about 60 weight percent of xylene, about 20 weight percent of methyl ethyl ketone, about 10 weight percent butyl acetate, and about 10 weight percent of ethylene glycol ethyl ether in an amount sufficient to form about a 50 weight percent dispersion of solids in solution, said mixture further containing about 0.3 weight percent as based on the weight of the resinous solids content of 2,4,6-tri(dimethylaminomethyl)phenol.

18. The thermosettable coating composition of claim 17 also containing pigment.

References Cited by the Examiner
UNITED STATES PATENTS

| | | | |
|---|---|---|---|
| 2,757,165 | 7/1956 | Slocombe | 260—80.5 |
| 2,772,252 | 11/1956 | Briskin et al. | 260—80.5 |
| 2,908,663 | 10/1959 | Masters | 260—45.5 |
| 2,923,695 | 2/1960 | Greenspan et al. | 260—31.4 |
| 3,008,914 | 11/1961 | Fry | 260—45.5 |
| 3,048,552 | 8/1962 | Fang | 260—837 |
| 3,065,195 | 11/1962 | Vasta | 260—837 |
| 3,073,793 | 1/1963 | Greenspan et al. | 260—31.4 |

MORRIS LIEBMAN, *Primary Examiner.*